(12) United States Patent
Holzmann et al.

(10) Patent No.: US 8,600,609 B2
(45) Date of Patent: Dec. 3, 2013

(54) METHOD FOR OPERATING A LONGITUDINAL DRIVER ASSIST SYSTEM OF AN AUTOMOBILE, AND AN AUTOMOBILE

(75) Inventors: Manfred Holzmann, Greding (DE); Carmen Staudte, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/356,174

(22) Filed: Jan. 23, 2012

(65) Prior Publication Data

US 2012/0191318 A1 Jul. 26, 2012

(30) Foreign Application Priority Data

Jan. 26, 2011 (DE) .......................... 10 2011 009 483

(51) Int. Cl.
| | |
|---|---|
| *B60K 31/00* | (2006.01) |
| *G01C 21/00* | (2006.01) |
| *G01C 22/00* | (2006.01) |
| *G06F 11/30* | (2006.01) |
| *B60T 7/12* | (2006.01) |
| *B60T 8/86* | (2006.01) |
| *B60T 8/92* | (2006.01) |

(52) U.S. Cl.
USPC .......... 701/29.3; 701/96; 701/30.3; 701/30.4; 701/30.5; 701/30.7; 701/30.8; 701/30.9; 701/31.1; 701/74; 701/75; 701/76; 701/77; 701/78; 701/79; 701/91; 701/93; 701/110; 701/119; 701/121; 701/498; 701/501; 180/170; 180/171

(58) Field of Classification Search
USPC .......... 701/29.3, 30.3, 30.4, 30.5, 30.6, 30.7, 701/30.8, 30.9, 31.1, 74–79, 91, 93, 96, 701/110, 119, 121, 220, 498, 501; 180/170–171
See application file for complete search history.

(56) References Cited

U.S. PATENT DOCUMENTS

| | | | |
|---|---|---|---|
| 2006/0142913 A1* | 6/2006 | Coffee et al. | 701/35 |
| 2007/0294020 A1* | 12/2007 | Riegel | 701/96 |
| 2009/0276135 A1 | 11/2009 | Hagemann et al. | |
| 2010/0023181 A1* | 1/2010 | Huang et al. | 701/1 |
| 2010/0198477 A1* | 8/2010 | Shirai | 701/96 |
| 2010/0250088 A1* | 9/2010 | Grolle et al. | 701/96 |
| 2011/0022247 A1 | 1/2011 | Stahlin et al. | |
| 2011/0208399 A1 | 8/2011 | Fekete et al. | |
| 2012/0191318 A1* | 7/2012 | Holzmann et al. | 701/96 |
| 2013/0066511 A1* | 3/2013 | Switkes et al. | 701/28 |

FOREIGN PATENT DOCUMENTS

| | | |
|---|---|---|
| DE | 102004053754 | 5/2006 |
| DE | 10 2005 026065 A1 | 12/2006 |
| DE | 102005026065 | 12/2006 |
| DE | 10 2008 036131 A1 | 3/2009 |
| DE | 102008036131 | 3/2009 |
| DE | 102009008403 | 8/2009 |
| DE | 102008002271 | 12/2009 |
| DE | 102008047143 | 3/2010 |
| EP | 2 251 240 A1 | 11/2010 |

(Continued)

*Primary Examiner* — Mary Cheung
*Assistant Examiner* — Atul Trivedi
(74) *Attorney, Agent, or Firm* — Henry M. Feiereisen, LLC

(57) ABSTRACT

A method for operating a longitudinal driver assist system of an automobile, in particular an ACC system, wherein environmental data of the automobile are evaluated with respect to travel in a longitudinal convoy with at least three automobiles which include the automobile and at least two additional automobiles, which are driving immediately behind one another and each have an active longitudinal driver assist system. A convoy value is formed, and at least one operating parameter of the driver assist system is adapted depending on the convoy value.

14 Claims, 3 Drawing Sheets

METHOD FOR OPERATING A LONGITUDINAL DRIVER ASSIST SYSTEM OF AN AUTOMOBILE, AND AN AUTOMOBILE

CROSS-REFERENCES TO RELATED APPLICATIONS

This application claims the priority of German Patent Application, Serial No. 10 2011 009 483.0, filed Jan. 26, 2011, pursuant to 35 U.S.C. 119(a)-(d), the content of which is incorporated herein by reference in its entirety as if fully set forth herein.

BACKGROUND OF THE INVENTION

The present invention relates to a method for operating a longitudinal driver assist system of an automobile, in particular in ACC (adaptive cruise control) system, as well as to an automobile with a driver assist system configured to carry out the method.

The following discussion of related art is provided to assist the reader in understanding the advantages of the invention, and is not to be construed as an admission that this related art is prior art to this invention.

Longitudinal driver assist systems for automobiles are known since some time. They control, based on appropriate braking and acceleration interventions, the distance, mostly in form of a time gap, from an automobile in front. The best-known example for such driver assist systems, also referred to as distance control systems, is the so-called ACC systems (Adaptive Cruise Control). These systems have in common that information forming the basis for the control of the distance and speed of an automobile driving directly in front is obtained from at least one sensor, in particular in a radar sensor and/or a video camera. This function is combined in ACC systems with an automatic speed control.

Problems may arise when several automobiles which are each equipped with a longitudinal driver assist system, in particular an ACC system, drive behind one another in a convoy, for example in stop-and-go traffic, in particular in city traffic. Although it can be assumed that the first two automobiles driving behind one another with an active driver assist system can follow each other under harmonic control, the longitudinal guidance may no longer function properly when a third automobile is added.

In particular during deceleration phases before a complete stop, for example when approaching a red traffic light, the system limits of the longitudinal driver assist system may be exceeded if the aforementioned problems exist, requiring manual intervention if the driver assist system is no longer capable to ensure an operative longitudinal guidance. However, the controller may start to "oscillate" when traveling in longitudinal convoy also in a typical low-speed operation, in particular in a stop-and-go operation, producing a type of accordion effect and causing an inefficient driving behavior (strong acceleration and strong braking). In this situation, the stability of actual longitudinal driver assist systems, in particular ACC systems, in a convoy can no longer be guaranteed.

These undesirable effects are caused, for example, by the delay times of the sensor system and the actuator system and by the time constants of the longitudinal guidance (longitudinal control), in particular by preset, predetermined gradients of the speed and the like or gradients located in a certain range. Delays in the technical field of sensors are mostly due to the type of the evaluation, when for example data are first made plausible or otherwise thresholds aiding in the safety of the detection must be overcome. The time constants of the longitudinal control of a longitudinal driver assist system are parameterized particularly by taking into account the driving comfort encountered in frequently occurring and typical traffic situations.

Time delays and time constants also occur in convoys where the vehicles are operated by human drivers; however, these delays and time constants are far less pronounced, because humans are able to recognize, evaluate and react and hence also drive with substantially more foresight than would be possible with actual driver assist systems. In addition, a "build up" in short convoys is much less likely, because the time delays and the time constants also do not match each other.

It would therefore be desirable and advantageous to obviate prior art shortcomings and to provide an improved control method which reduces, and potentially completely eliminates, problems in a longitudinal driver assist systems during travel in a convoy.

SUMMARY OF THE INVENTION

According to one aspect of the present invention, a method for operating a longitudinal driver assist system of an automobile includes the steps of evaluating environmental data of a first automobile relating to current travel in a longitudinal convoy which includes at least three automobiles, including the first automobile and at least two additional automobiles driving directly behind one another, with each of the first automobile and the at least two additional automobiles having an active longitudinal driver assist system, forming a convoy value from the evaluated environmental data, and adapting at least one operating parameter of the driver assist system of the first automobile based on the convoy value.

The invention thus proposes to recognize the specific situation of a convoy consisting of at least three automobiles with actively operating longitudinal driver assist systems, in particular ACC systems, and to ensure—by suitable re-parameterizing of the longitudinal control adapted to the situation—that the particular situation of traveling in a convoy is mastered, eliminating the need for the driver to intervene, while if possible staying inside the system boundaries of the longitudinal driver assist system. Of particular interest is hereby the situation where a longitudinal convoy with at least two additional automobiles travels directly in front of the automobile and is also equipped with an active longitudinal driver assist system. If the method according to the invention is then limited to those situations wherein at least two automobiles with an active driver assist system travel in front of the own automobile, then the first two automobiles of a longitudinal convoy do not require a parameter adaptation.

It is therefore generally proposed to select the operating strategy for the driver assist system so that it can still be operated within its system boundaries even when traveling in a longitudinal convoy, wherein the typical comfort of the longitudinal guidance for the driver may optionally have to be restricted, which will be described in more detail below. This is based on the realization that it would be much less comfortable for the driver to intervene manually.

The method according to the invention may be used only when the speed of the automobile is less than a predetermined limit value, in particular at speeds <50 km/h, because problems occur most frequently at lower speeds, in particular in stop-and-go traffic. Speed ranges may then be excluded even if problems do not occur in convoy travel when using the normal operating parameters, so as to keep any reductions in the comfort level as small as possible.

With the present a method, the special situation of traveling in longitudinal convoy can therefore advantageously be mastered, so that the driver is not forced to intervene manually. The driver assist system, in particular the ACC system, is viewed as being more anticipatory even if a small loss in comfort must be accepted in some driving situations.

According to an advantageous feature of the present invention, the convoy may also include binary information indicating if a longitudinal convoy is driven (and optionally at which position) or not. However, additional factors may advantageously be taken into consideration when adapting the parameters, which may be shown in the convoy value or may be introduced as additional parameters. For example, the parameters may be adapted depending on the average speed of the convoy, the number of the automobiles in the convoy, their position in the convoy and the like.

According to an advantageous feature of the present invention, for reducing a reaction time of the driver assist system, the at least one operating parameter may be adapted to the behavior of the automobile driving directly in front of the automobile when travel in a longitudinal convoy is detected. In this embodiment, mainly the delay times and time constants are minimized. Because the driver assist system is able to react more quickly, a built-up or summation of the reaction time durations is prevented or at least reduced, improving travel in a convoy.

According to another advantageous feature of the present invention, by adapting the operating parameters, the distance control can be made tighter than when traveling outside a longitudinal convoy. This may optionally occur at the expense of a comfortable and soft distance control and is, last but not least, a comfort aspect. For example, intervention times in travel interventions intended for longitudinal guidance may occur earlier though suitably re-parameterization of the driver assist system algorithm.

According to yet another advantageous feature of the present invention, adapting the operating parameters may increase a maximum allowable brake deceleration. A maximum brake deceleration is frequently included in the normal operation of the driver assist system, commensurate with comfort criteria. This limitation can now be changed in the special situation when traveling in a longitudinal convoy, so that system limits may be reached less quickly through optionally harder braking interventions and the overall duration for the reaction response may be shortened.

The actual driving situation may also be evaluated more rapidly, in particular by accelerating filtering of measurement data. In this way, operating parameters are adapted to allow an earlier identification of the target and evaluation of the situation, which may, however, occur at the expense of a reliable identification of the target and evaluation of the situation. The parameters should hereby be changed such that a problem/obstacle/target can optionally be identified early enough, albeit with an error, however, this represents a low risk compared to a situation where the problem/obstacle/target is not identified at all, and the like. For example, filtering of the measured state parameters of the automobile in front can be softened/performed more quickly. This further reduces delay times.

Advantageously, an electronic drawbar may be realized by adapting the operating parameters. Such adaptation which implements the concept of a so-called electronic drawbar, attempts to evaluate the behavior of the automobile directly in front by intelligent prediction of the vehicle parameters of the control object or target object. This represents a particularly tight case of the aforementioned distance control which, although allowing a fast reaction with extremely short delay times and time constants, frequently causes by a loss of comfort.

According to an advantageous feature of the present invention, the operating parameter may be adapted to allow a more rapid response of an actuating system addressed by the driver assist system, in particular by eliminating or reducing jerk limits and/or by allowing a more rapid increase in pressure in an ESP (Electronic Stability Program) system. Operating parameters of the corresponding actuator system itself may hereby be changed, for example at an interface, if this actuator system affects the function of the driver assist system. One pertinent example relates to the elimination of jerk limits, meaning limits of the temporal change of the acceleration of the automobile. According to another exemplary embodiment, which can be used in additionally or alternatively, chassis systems, in particular of an ESP system, may be conditioned accordingly.

According to another advantageous feature of the present invention, once travel in a longitudinal convoy has been detected, the at least one operating parameter may be adapted by increasing the set time gap and/or by expanding a set time gap interval. In this context, the time gap is advantageously increased and/or the time gap interval is advantageously expanded commensurate with the position of the own automobile in the longitudinal convoy. The safety can thus be increased compared to actual systems while maintaining the comfort, since the room to maneuver is increased for the driver assist system, because a safety-critical distance is only attained at a later time.

Travel in a longitudinal convoy can be detected with the method according to the invention in several ways, which may all be used in combination, for example within the context of mutual plausibility checks.

For example, dynamic data describing the absolute and/or relative movement of the at least two automobiles driving in front end of the own automobile may be evaluated as environmental data. Accordingly, characteristic parameters of the movement of the own automobile and of the automobiles in front and/or characteristic parameters of the automobiles in front and of the own automobile with respect to one another, for example relative acceleration and the like, are taken into consideration. The basic idea is hereby to determine if a movement between the automobiles of the actual convoy is correlated, which would indicate an automatic control by a longitudinal driver assist system. Different conditions may then be checked, optionally also within the context of fuzzy logic. For example, a condition for traveling in a longitudinal convoy may include situations where the change in the speed over time of the own automobile and the at least two automobiles in front is between a predetermined minimum value and a predetermined maximum value. Additional conditions to be checked may include, if the reaction times of the mobiles correspond to one another within a tolerance range and/or if the deceleration of the automobile in the convoy decreases and/or if the functionality of the driver assist system may shortly be canceled. It may also be feasible to infer travel in a longitudinal convoy by estimating the system limits or by estimating when these system limits are reached. It will be understood that other assumptions/criteria may also be used to find a possible movement correlation.

According to an advantageous feature of the present invention, signals received as environmental data from at least one radar sensor associated with the driver assist system may be evaluated for the presence of additional longitudinal driver assist systems, in particular by performing a high-frequency analysis. The idea is here to not only evaluate the reflections from the own transmitted radar signal, but also the additional radar signals which are not coherently received. For example, a spectral analysis may be performed to determine the number of longitudinal driver assist systems equipped with the radar sensors which are additionally present in the environment of the own automobile.

According to an advantageous feature of the present invention, communication data of a communication device configured for communicating with other automobiles may be evaluated as environmental data. In this embodiment, car-to-car systems and more generally car-to-x systems may be used to collect additional information about automobiles having active longitudinal driver assist systems in the environment of the own automobile. For example, if another automobile transmits information that its longitudinal driver assist system is active, its location and in the direction in which it travels, travel in a longitudinal convoy may be readily identified if the automobiles of the convoy are equipped with corresponding communication options.

In addition, image data of a camera, particularly a camera associated with the driver assist system, may be evaluated, in particular with respect to the illumination of brake lights of at least one automobile in front. In this embodiment, it may be possible to check if the automobile directly in front, or if visible with an offset, the automobile in front of the automobile directly in front, has a cyclically illuminating brake light and the like, which would indicate with its pattern the activity of a longitudinal driver assist system. Therefore, camera information may also be used.

According to another aspect of the invention, the invention also relates to an automobile, which includes a longitudinal driver assist system with a controller configured for performing the method according to the invention. All discussions relating to the method of the invention can be similarly applied to the automobile according to the invention, so that the advantages attained within the context of the present invention can likewise be attained. The driver assist system may be, in particular, an ACC system with an associated camera and/or an associated radar sensor.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
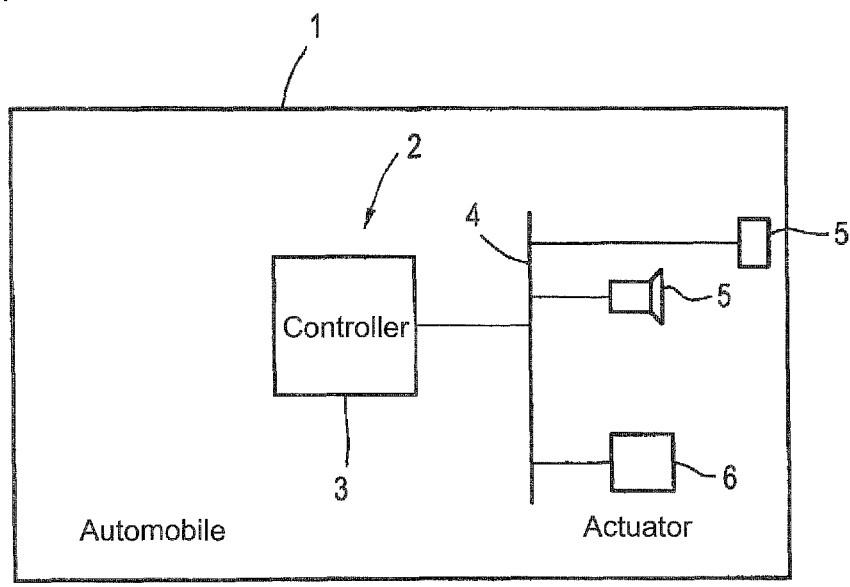
FIG. 1 an automobile according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an automobile 1 according to the invention. The automobile 1 includes a longitudinal driver assist system 2, the operation of which is controlled by a controller 3 configured to carry out the method according to the invention. The controller 3 is connected by way of a bus system 4, for example a CAN bus, with sensors 5 associated with the driver assist system 2, in this embodiment radar sensors and a camera. The bus system 4 can also be used to address actuators 6 of the automobile 1 used for performing driving interventions of the longitudinal driver assist system 2, which in this example is constructed as an ACC system. The actuators 6 may include, for example, an ESP system and engine components.

It also be understood that additional vehicle systems (not illustrated in detail), for example sensors measuring the own movement of the automobile 1 and the like, may be addressed via the bus system 4.

Figure 2:
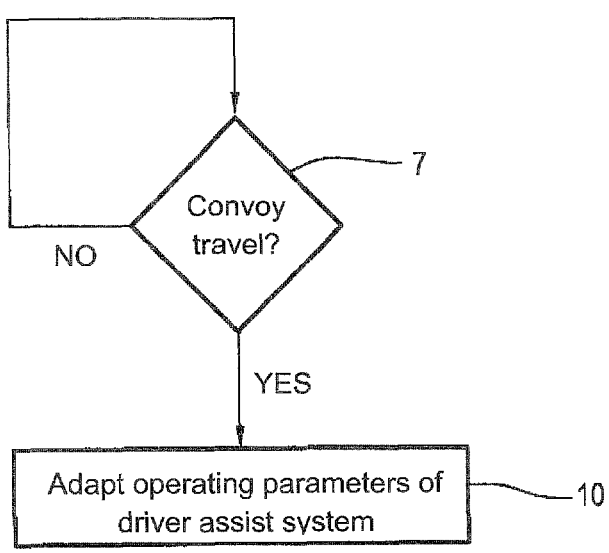
FIG. 2 a flow diagram of the method according to the invention.
Figure 3:
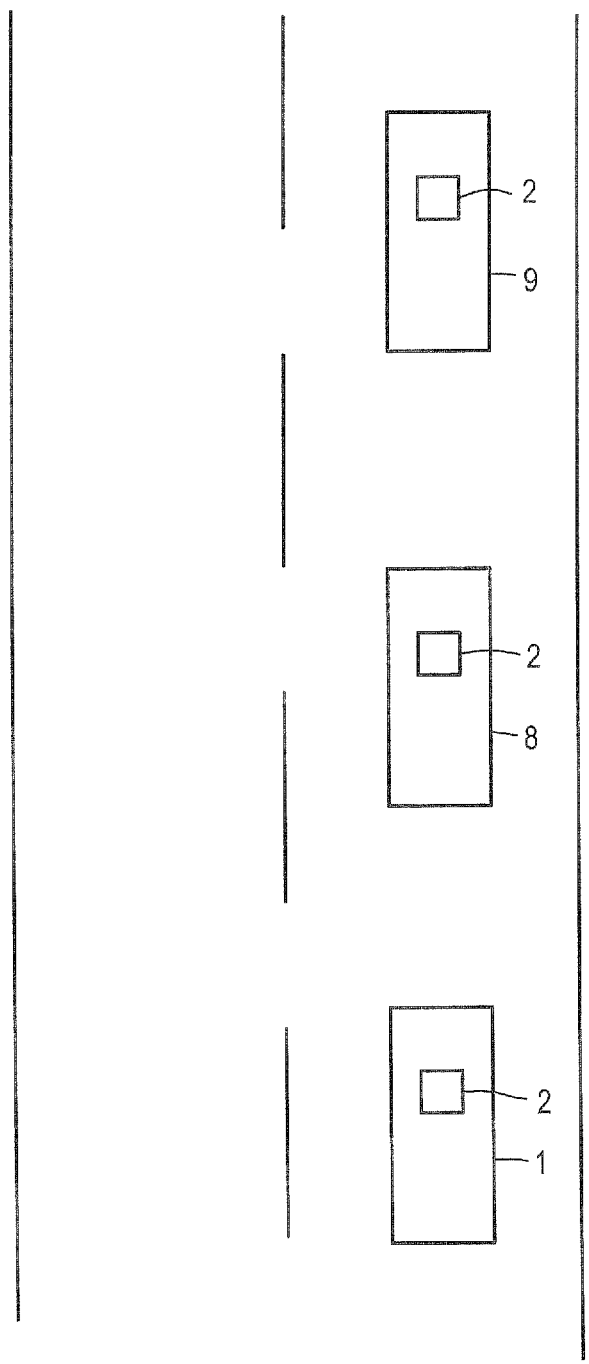
FIG. 3 the automobile according to the invention in a longitudinal convoy.

The controller 3 is configured for executing the control method according to the invention for a driver assist system 2 of this type, which substantially checks, see step 7 in FIG. 2, if the vehicle is presently part of a longitudinal convoy, meaning if the vehicle travels in a longitudinal convoy. A longitudinal convoy includes at least three automobiles directly following each other, with all automobiles having an active driver assist system 2. In the present embodiment, travel in a longitudinal convoy is detected by checking if the two automobiles 8, 9 (see FIG. 3) driving directly in front of the own vehicle 1 have themselves an active driver assist system 2 for longitudinal guidance.

Several possibilities which may also be used in combination exist for actually determining a convoy value which indicates if the automobile 1 is traveling in a longitudinal convoy. For example, it may be checked if the movements of the automobiles 8, 9 and optionally 1 are correlated, which would indicate the presence of an active longitudinal driver assist system 2, i.e. automatic longitudinal guidance of the automobiles 8, 9. For example, different criteria may be considered which compare characteristic parameters of the movement for correlated movement events. For example, if the automobile 9 brakes and shortly thereafter the automobile 8 brakes, then the own vehicle 1 will also brake shortly thereafter. One criterion that can be checked is therefore if the temporal change in the speed of the automobiles 9, 8 and 1 is similar and/or lies between a predetermined minimum value and a predetermined maximum value. Similarly, for example, the times between the corresponding movement events may be taken into consideration; for example, the time sequence may be checked when each of the automobiles 8, 9 and 1 brakes. If the times are similar, then this also suggests the presence of similar longitudinal driver assist systems 2. The correlation between the employed brake deceleration of the consecutive automobiles may be checked, for example if the brake deceleration of the own vehicle 1 is greater than a minimum brake deceleration, but smaller than the brake deceleration of the automobile 9, which in turn is smaller than the brake deceleration of the automobile 8. It is evident that different assumptions and criteria may be used and combined with one another to determine the presence of a longitudinal convoy based on a comparison of correlated movement actions.

Travel in a convoy may also be detected based on the evaluation of signals received from the radar sensors associated with the driver assist system 2. The radar sensors may be analyzed using high-frequency analysis, wherein the presence of additional driver assist systems 2 can be confirmed based on the radar signals received from these driver assist systems 2.

According to another possibility, the automobile 1 may have a communication device (not illustrated in FIG. 1), for example as part of a car-to-x system, configured to receive in the environment of the automobile 1 communication data about the automobiles 8, 9. The automobiles 8, 9 may, for example, transmit directly or indirectly if their driver assist system 2 is active and where they are exactly located, so that a conclusion can be drawn about travel in a longitudinal convoy.

Video information from the camera, meaning image data, may also be evaluated to detect, for example, a cyclical brake light actuation of the automobiles 8, 9 in front and to conclude therefrom the presence of the active driver assist systems 2.

One or preferably several of the illustrated possibilities for detecting travel in a longitudinal convoy is performed at step 7. This step finally produces the convoy value which may indicate, optionally with more detailed information, if the automobile is actually part of a longitudinal convoy. If this is the case, then the operating parameters of the driver assist system 2 are adapted at step 10 (FIG. 2). In the present example, several adaptations are performed, with exemplary details being provided in FIG. 4.

Figure 4:
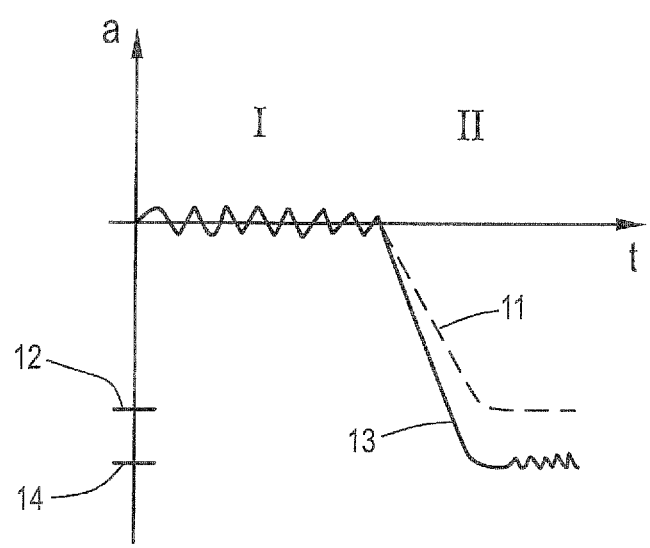
FIG. 4 a possible change of operating parameters.

FIG. 4 considers two possible adaptations of operating parameters of the driver assist system 2 which causes a reduction of the reaction time of the driver assist system 2 with respect to the automobile 8 driving directly in front of the automobile 1. The actual acceleration a of the automobile 1 is depicted as a function of time t. At the end of the region I, where the speed is controlled to a constant desired speed, the automobile 1 now decelerates by braking to the speed of the automobile 8 in front. The dashed line 11 shows a curve of the acceleration under normal operation of the driver assist system 2. It can be seen that a specific gradient is used, based on which the acceleration decreases to a maximum brake deceleration 12. To achieve a tighter ("harder") and more effective distance control when traveling in a longitudinal convoy, a steeper gradient becomes possible when traveling in longitudinal convoy, as shown in curve 13. In addition, the maximum possible brake deceleration 14 is increased. Because the room to maneuver is now greater for the driver assist system 2, on one hand, effects in a longitudinal convoy can be prevented through quicker reactions and, on the other hand, such effects can also be countermanded by corresponding modified interventions.

The suitability of the driver assist system for travel in a longitudinal convoy can be further improved through additional adaptations in the operating parameters. For example, data acquisition and data processing may be optimized. For example, operating parameters may be changed, allowing earlier identification of a target and evaluation of a situation, in particular with filters for environmental, data and the like. Advantageously, a faster response time of the actuators 6 may become possible. For example, jerk limits may be lowered/eliminated or operating parameters of an ESP system may be adapted by, for example allowing a faster buildup of the brake pressure.

Moreover, the set time gap may advantageously be expanded, i.e., a greater tolerance range may be allowed, which increases the overall operating margin of the driver assist system 2. The time gap may also be increased which would allow a greater margin before critical time gaps are reached. This adaptation also takes into account the position of the automobile 1 in the longitudinal convoy.

All these adaptations are performed at step 10. It should be emphasized again that the convoy value may also be determined not in binary form, as already described with reference to expanding/increasing the time gap, and/or that additional parameters may be taken into consideration for truly adapting the operating parameters to the actual driving situation.

Lastly, it should be noted that in this embodiment of the method of the invention the check at step 7 may only take place when the speed of the automobile 1 is less than a predetermined speed, for example 50 km/h. The operating parameter and any potentially associated reduction in comfort may only be implemented if actually necessary.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a longitudinal driver assist system of an automobile, comprising the steps of:
    evaluating environmental data of a first automobile relating to current travel in a longitudinal convoy which comprises at least three automobiles, including the first automobile and at least two additional automobiles driving directly behind one another, with each of the first automobile and the at least two additional automobiles having an active longitudinal driver assist system,
    wherein the environmental data comprise a coherently-received radar signal associated with the driver assist system of the first automobile and non-coherently received radar signals associated with the active longitudinal driver assist systems of the at least two additional automobiles,
    performing in the first automobile a spectral analysis of the non-coherently received radar signals,
    detecting from the spectral analysis a number of additional active longitudinal driver assist systems,
    forming a convoy value from the evaluated environmental data, and
    adapting at least one operating parameter of the driver assist system of the first automobile based on the convoy value.

2. The method of claim 1, wherein the driver assist system is an ACC system.

3. The method of claim 1, further comprising the steps of:
    detecting travel of the first automobile in a longitudinal convoy, and
    adapting the at least one operating parameter to behavior of the additional automobile driving directly in front of the first automobile for reducing a reaction time of the driver assist system of the first automobile.

4. The method of claim 3, wherein the at least one operating parameter is adapted for obtaining at least one feature selected from the following features:
    a distance control that is tighter than a distance control when traveling outside a longitudinal convoy,
    an increase in a maximum permissible brake deceleration, a more rapid evaluation of an actual driving situation, in particular by accelerating filtering of measurement data, and realization of an electronic drawbar.

5. The method of claim 3, wherein the driver assist system addresses an actuator system, and the at least one operating parameter is adapted so as to provide a faster response of the actuator system.

6. The method of claim 5, wherein the at least one operating parameter is adapted by eliminating or lowering jerk limits or by enabling a faster pressure build-up in an ESP (Electronic Stability Program) system, or a combination thereof.

7. The method of claim 3, wherein when travel in a longitudinal convoy is detected, the at least one operating parameter is adapted with respect to a set time gap or an increase in a set time gap interval, or both.

8. The method of claim 1, wherein dynamic data describing an absolute or the relative movement of the at least two additional automobiles in front and of the first automobile are evaluated as environmental data.

9. The method of claim 8, wherein a condition for traveling in a longitudinal convoy includes at least one of the following features:

a change in a speed of the first automobile over time or a change in a speed of the at least two additional automobiles in front has a value between a predetermined minimum value and a predetermined maximum value, reaction times of the first automobile and of the at least two additional automobiles correspond to each other within a predetermined tolerance range, deceleration of the first automobile and of the at least two additional automobiles within the longitudinal convoy decreases, and a cancellation of a function of the driver assist system is imminent.

10. The method of claim 1, wherein the spectral analysis is a high-frequency analysis.

11. The method of claim 1, wherein the environmental data comprise communication data of a communication system configured to communicate with the at least two additional automobiles.

12. The method of claim 1, wherein the environmental data comprise image data of a camera associated with the driver assist system of the first automobile.

13. The method of claim 12, wherein the image date indicate illumination of brake lights of at least one of the at least two automobiles driving in front of the first automobile.

14. An automobile, comprising a longitudinal driver assist system having a controller configured to evaluate environmental data of the automobile relating to current travel in a longitudinal convoy which comprises at least three automobiles, including the automobile and at least two additional automobiles driving directly behind one another, with each of the at least two additional automobiles also comprising an active longitudinal driver assist system, wherein the environmental data comprise a coherently-received radar signal associated with the driver assist system of the first automobile and non-coherently received radar signals associated with the active longitudinal driver assist systems of the at least two additional automobiles, perform in the first automobile a spectral analysis of the non-coherently received radar signals.

detect from the spectral analysis a number of additional active longitudinal driver assist systems, form a convoy value from the evaluated environmental data, and adapt at least one operating parameter of the driver assist system of the automobile based on the convoy value.

* * * * *